Figure 1:
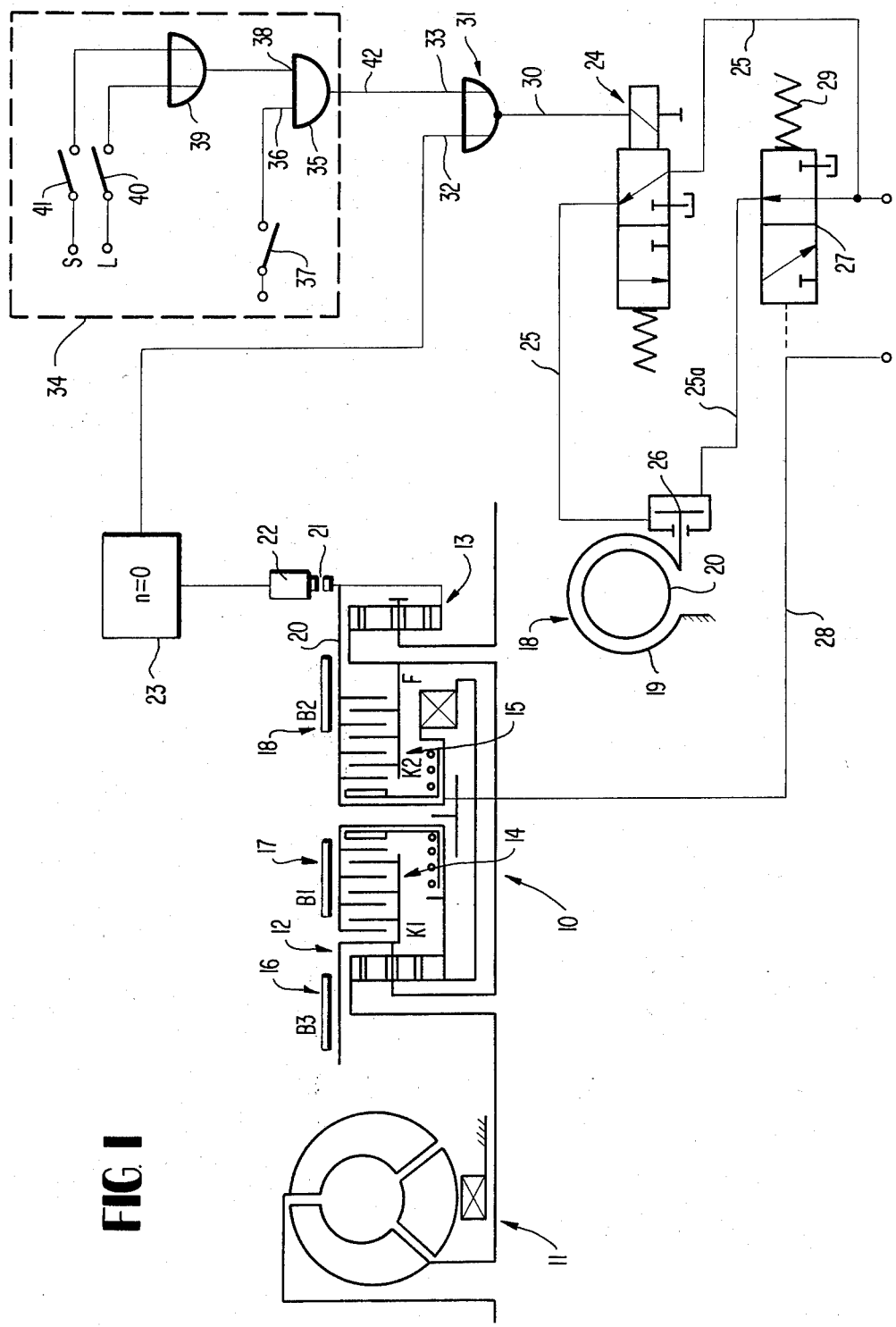

United States Patent [19]

Förster et al.

[11] 3,983,766

[45] Oct. 5, 1976

[54] CONTROL INSTALLATION FOR AUTOMATICALLY SHIFTED PLANETARY GEAR CHANGE-SPEED TRANSMISSIONS

[75] Inventors: Hans-Joachim Förster, Stuttgart-Riedenberg; Hermann Gaus, Stuttgart-Sillenbuch, both of Germany

[73] Assignee: Daimler-Benz Aktiengesellschaft, Stuttgart, Germany

[22] Filed: June 21, 1974

[21] Appl. No.: 481,842

[30] Foreign Application Priority Data
June 29, 1973 Germany............................ 2333099

[52] U.S. Cl. ............................................... 74/866
[51] Int. Cl.² ......................................... B60K 41/04
[58] Field of Search ............... 74/866; 307/218, 215

[56] References Cited
UNITED STATES PATENTS

| | | | |
|---|---|---|---|
| 3,662,193 | 5/1972 | Braddock......................... | 307/218 X |
| 3,680,410 | 8/1972 | Sumiyoshi et al..................... | 74/866 |
| 3,684,066 | 8/1972 | Kubo et al. ....................... | 74/866 X |
| 3,751,683 | 8/1973 | Drost................................. | 307/218 |
| 3,752,011 | 8/1973 | Casey et al. ..................... | 74/866 X |

*Primary Examiner*—Samuel Scott
*Assistant Examiner*—Frank M. McKenzie, Jr.
*Attorney, Agent, or Firm*—Craig & Antonelli

[57] ABSTRACT

A control installation for shifting back an automatically shifted planetary gear change-speed transmission in which the various speeds are adapted to be engaged by servo-devices that are actuated by a pressure medium whereby the servo-device of the speed to be engaged is brought into readiness and is fully engaged only after the determination of the correct shifting point by means of at least one feeler device as a function of the latter; a solenoid valve is coordinated to the pressure line leading to the actuating member of the servo device and is adapted to be shifted by means of a shifting pulse into a position releasing the pressure to the actuating member of the servo-device whereby the shifting pulse is triggered by at least one rotational speed transmitter which detects the rotational speed condition of a corresponding transmission member.

16 Claims, 2 Drawing Figures

CONTROL INSTALLATION FOR AUTOMATICALLY SHIFTED PLANETARY GEAR CHANGE-SPEED TRANSMISSIONS

The present invention relates to a control installation for the shifting-back of automatically shifted planetary gear change-speed transmissions, especially for motor vehicles, in which the various speeds are adapted to be engaged or shifted by pressure-medium-actuated servo-devices, whereby the servo-device of the speed to be engaged is brought into readiness and only after a determination of the correct shifting point by means of at least one feeler or sensing member, is adapted to be completely engaged in dependence of the latter.

In order to render the shifting operations in automatically shifted change-speed transmissions from the direct into a speed-reduced gear or lower speed as shock-free as possible, it is appropriate to disengage the actuated shifting element so far that it can no longer transmit the full load. The driving engine thereby increases in rotational speed. The shifting or engaging member of the lower or speed-reduced gear now has to seize or engage precisely at the instant, at which the engine has reached a rotational speed corresponding to a new transmission ratio. With planetary gear transmissions, this is the case when the two elements to be connected have reached the same rotational speed, or if a part thereof changes the direction of rotation, i.e., stands still momentarily. Since the shifting members require a certain filling time for their actuation, it is appropriate to bring the servo-member to be actuated into a readiness position when the previously engaged servo-member begins to disengage. It is then assured thereby that the new shifting member can seize and engage within the shortest possible time at rotational speed equality of the parts to be connected.

With transmissions having band brakes, constructions are known in which the change of the support force of the brake band with an alternating slippage direction is utilized in order to engage the brake band at the instant of the reversal of the direction of rotation of the brake drum (German Pat. No. 1,140,087). This, however, involves a purely mechanically operating installation.

The present invention is now concerned with the task to still further improve this known arrangement as regards its accuracy and to simplify the same in construction. The underlying problems are solved according to the present invention in that a solenoid or electromagnetic valve is coordinated to the pressure line leading to the actuating member of the servo-device of the speed to be engaged and is adapted to be shifted by means of a shifting pulse into a position releasing the pressure to the actuating member and in that the shifting pulse is adapted to be triggered by at least one rotational speed transmitter or pick-up which detects the rotational speed condition of a corresponding transmission member. The solenoid valve may thereby act directly or indirectly. It is proposed for the construction of this inventive concept that for purposes of engagement of a band brake, a toothed means is arranged at the brake drum or at a part positively rotating therewith, a conventional inductive rotational speed transmitter is coordinated to this toothed means and a pulse is adapted to be triggered by the latter during standstill or reversal of the direction of rotation. The various methods which can be used therefor are known as such, for example, the spacing in time of two pulses transmitted by the rotational speed sensor may be measured, whereby upon exceeding a predetermined spacing, the output signal for the rotational speed is made equal to zero. If the amplitude of the output signal of the rotational speed transmitter is utilized, then upon falling below a threshold value, a signal for the rotational speed "zero" can be obtained. If two rotational speed transmitters are arranged offset with respect to one another by one-half pulse each in relation to the toothed means, then the reversal of the direction of rotation and therewith the passage through zero can be detected from the time sequence of the pulses. It is also possible in principle to utilize other rotational speed detecting systems, for example, of conventional photoelectric type. Furthermore, all proposals according to the present invention may also be applied analogously to lamellae brakes.

Another possibility for the construction of the inventive concept resides in that one toothed means and one inductive frequency transmitter each is arranged at the input and output member of the transmission and a voltage proportional to the input and output rotational speed is formed by means of one frequency voltage converter each, and in that the ratio is formed from the two voltages and a pulse is adapted to be triggered in a comparator if this ratio is equal to or larger than a voltage value corresponding to the respectively engaged speed.

In both cases, one obtains the advantage of a very accurate electronic detection of the standstill and therefore a very accurate shock-free shifting operation. Also, the structural expenditures are small and the manufacture is simple. This is true in particular for the last-mentioned constructional possibility since in that case—independently of the number of the existing speeds and shifting members—the entire transmission can be controlled practically with two toothed means and two frequency transmitters. The comparator then necessary may be readily realized electronically and represents no particular structural expenditure.

If a shifting-back is forced by shifting the range selector lever into a lower position, for example, into S or L, then with an idling gas position of the throttle valve, the driving engine can no longer catch up in its rotational speed when the clutch of the speed to be disengaged, is actually disengaged or released. The above-described control would therefore remain ineffectual in such a case. For this case of the so-called brake engagement, the solenoid valve is actuated according to the proposal of the present invention by an installation for a forced shifting-back operation. It is thereby proposed in particular by the present invention that the solenoid valve is connected with the output of a NOR-element, to the first input of which is connected the pulse transmitter or comparator and to the second input of which is connected the aforementioned installation for the forced shifting-back. In principle, also an OR-element would be feasible in that case. However, it is appropriate to negate the output of such an OR-element, which means, if a signal for drum standstill or brake back-shifting operation exists, the voltage at the solenoid valve then disappears and the disengaging side of the brake band piston is relieved. This offers the advantage that the brake band in case of voltage failure, for example, in case of cable breakage, is immediately fully shifted and engaged and thus a destruction is avoided even if it is connected with a shifting shock.

A further proposal of the present invention resides in that the installation for a forced shifting-back operation includes two shifting devices, of which each is adapted to be closed during the actuation of the selector lever into a lower range (for example, into S or L) and in that each shifting device is connected with the input of an OR-element. In lieu of switches, of course, also pulse transmitters or threshold switches may be used. Finally, it is also proposed by the present invention that a shifting device be arranged at the control member of the driving engine which in the position of "idling gas" closes and which is connected with the first input of an AND-element, whose second input is connected with the output of the OR-element, and whose output is connected with the second input of the NOR-element.

Accordingly, it is an object of the present invention to provide a control installation for shifting-back automatically shifted planetary gear change-speed transmissions, especially for motor vehicles, which avoids by simple means the aforementioned shortcomings and drawbacks encountered in the prior art.

Another object of the present invention resides in a control installation, controlling the shifting-back operation of automatically shifted change-speed transmissions which improves the accuracy and simplifies the construction thereof.

A further object of the present invention resides in a control installation for controlling the shifting-back operations of automatically shifted change-speed transmissions in which a very accurate electronic detection of the standstill and therefore a very accurate shock-free shifting operation is made possible by simple means.

Still a further object of the present invention resides in a control installation of the type described above which involves relatively slight structural expenditures as well as a simple manufacture.

Figure 2:
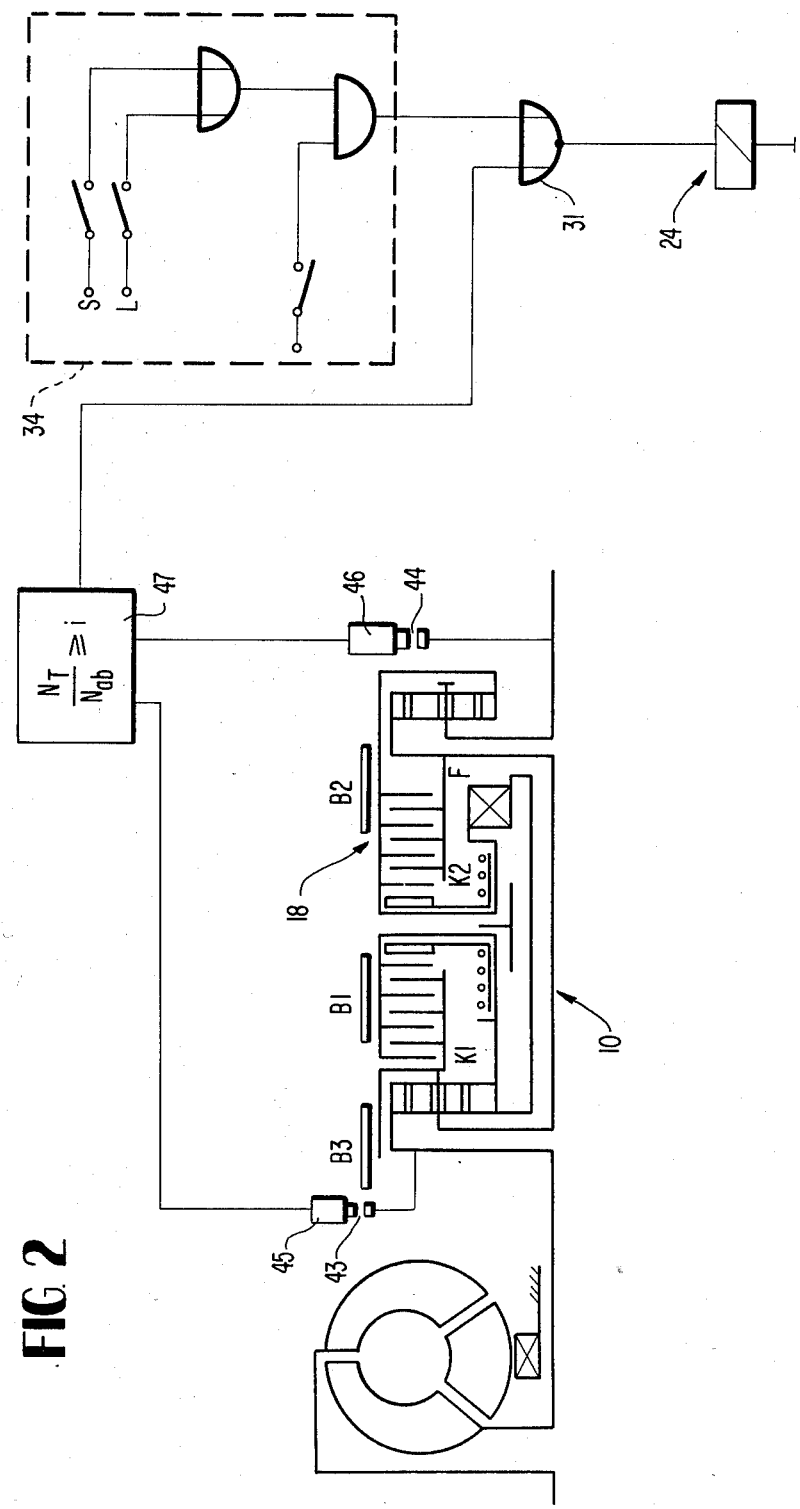

These and other objects, features and advantages of the present invention will become more apparent from the following description when taken in connection with the accompanying drawing which shows, for purposes of illustration only, two embodiments of the present invention; and wherein:

FIG. 1 is a schematic view of the transmission and shifting circuit for a control installation operable to provide a shifting-back operation in accordance with the present invention from third into second speed of a three-speed transmission; and FIG. 2 is a schematic view of the transmission and control installation for a modified embodiment illustrating the same shifting-back operation.

Referring now to the drawing wherein like reference numerals are used throughout the two views to designate like parts, and more particularly to FIG. 1, the transmission of this figure consists of a mechanical unit generally designated by reference numeral 10 and of a hydrodynamic unit generally designated by reference numeral 11 which is connected in front of the mechanical unit 10. A planetary gear change-speed transmission which consists of two planetary gear sets 12 and 13 serves as mechanical unit 10, whose construction and mutual interconnection is not described herein since it is known as such in the art. For purposes of engaging the three speeds, two clutches generally designated by reference numerals 14 and 15 as well as three band brakes generally designated by reference numerals 16, 17 and 18 are provided. The construction of these clutches and brakes, like the transmission itself, forms no part of the present invention and therefore is not illustrated in detail herein.

In third speed, both clutches 14 and 15 are engaged, i.e., therefore both planetary gear sets 12 and 13 rotate as a unitary block. For shifting down to the second speed, the clutch 15 is now disengaged in the planetary gear set 13 coordinated to the output and instead the brake 18 is engaged. In order that the brake band 19 of this brake 18 is able to engage shock-free, the reversal of the direction of rotation at the reaction member, i.e., therefore at the brake drum 20 is detected. For this purpose, a toothed means 21 is arranged at the brake drum 20, to which is coordinated an inductive rotational speed transmitter or transducer 22 of any conventional construction. The latter triggers a shifting pulse by way of an electronic unit 23 also of conventional construction when the brake drum 20 has the rotational speed "zero," i.e., when therefore the direction of rotation is about to change.

This shifting pulse serves for the actuation of a solenoid valve generally designated by reference numeral 24 of conventional construction which is interconnected into a pressure line 25 leading to the actuating member 26 of the band brake 18 and which is normally in the illustrated position. A double-acting piston serves as actuating member 26 which is adapted to be acted upon by the aforementioned line 25 on its relief side and by way of a second line 25a on its pressure side. The last-mentioned line 25a is connected by way of a control valve 27 which is adapted to be acted upon by the clutch pressure at the clutch 15.

In the illustrated position, the shifting-back from third into second speed has already been prepared by a control valve (not shown) of conventional construction i.e., the line 28 to the clutch 15 has become pressureless so that the clutch 15 is disengaged. As a result thereof, the control valve 27 is displaced by its spring 29 into the illustrated positon, i.e., the double-acting actuating piston 26 receives pressure on both sides by way of the lines 25 and 25a. By reason of the differences in areas on the two sides of the piston, a slight engaging force is produced at the brake band 19 so that the brake is pre-engaged, so to speak of.

When the brake drum 20 stands still, i.e. $n = 0$, shifting pulse is triggered by the electronic unit 23 in a conventional, known manner whereupon the solenoid valve 24 passes over into its other position. As a result thereof, the line 25 is interrupted, and the back side of the actuating piston 26 becomes pressureless. However, the full pressure remains on its front side so that now the brake 18 is engaged. Since the brake drum 20 stands still at that time, this engagement takes place shock-free.

In order that a shifting-back can take place also during a change of the selector lever position, the line 30 to the solenoid valve 24 is connected to the output of an NOR-element generally designated by reference numeral 31, to the first input 32 of which is connected the already described electronic unit 23 and whose second input 33 is operatively connected with an installation 34 for a forced shifting-back operation. The installation 34 includes an AND-element 35, to the first input 36 of which is connected an idling gas switch 37 which is closed in the idling gas position of the drive pedal or produces a pulse under those conditions. An OR-element 39 is operatively connected to the second input 38 of the AND element 35. The two inputs of the OR-element 39 are connected respectively to a switch 40 and 41 for the two selector lever positions S and L.

The operation of this installation 34 is believed apparent from the drawing. A pulse appears at its output 42 when either the selector lever position S or the selector lever position L is engaged and the idling gas switch 37 is in the position of "idling gas," i.e., is closed or produces a pulse. Consequently, a pulse now disappears at the output 30 of the NOR-element 31 if either the electronic unit 23 responds or the already-described installation 34 produces a pulse. As a result of the disappearance of the pulse in this case, the solenoid valve 24 is shifted into the other position by its spring.

According to FIG. 2, the construction of the transmission 10 and of the installation 34 for the forced shifting-back operation is exactly the same. Also, the solenoid valve 24 corresponds to the arrangement according to FIG. 1. However, the determination of the correct shifting point of time for the engagement of the band brake 18 now takes place in a different manner. For this purpose, one toothed means 43 and 44 each is arranged at the input member of the transmission 10 as also at the output member of the transmission 10. One frequency transmitter 45 and 46 each is coordinated to these toothed means 43 and 44, respectively.

Two voltages are formed in the electronic unit 47 by conventional means which are proportional respectively to the input rotational speed and to the output rotational speed of the transmission 10. These two voltages are put into a ratio with respect to each other and are compared with the transmission ratio $i$ of the respectively engaged speed. In the instant case, it involves a shifting-back operation from third into second speed. The comparing magnitude is therefore the transmission ratio of the second speed. In now the already-described voltage ratio and therewith the rotational speed ratio is larger than or equal to this tranmission ratio $i$, then a pulse is triggered at the output of the electronic unit 47 is a conventional manner, which causes in the already-described manner by way of the NOR-element 31 the shifting of the solenoid valve 24.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A control installation for shifting-back an automatically shifted change-speed transmission in which the various speeds are adapted to be shifted by servo-means actuated by a pressure medium, and in which the servo-means of the speed to be engaged is brought into operational readiness and is fully shifted by a feeler means only after the determination of the correct shifting point by said feeler means, characterized in that the servo-means of the speed to be engaged includes an actuating member operatively connected with a pressure line, a solenoid valve means being coordinated to the pressure line leading to the actuating member of the servo-means of the speed to be engaged, said solenoid valve means being operable to be shifted by a shifting pulse into a position releasing the pressure on the actuating member of the servo-means of the speed to be engaged, and means for producing the shifting pulse independently of the detection of engine speed by at least one rotational speed transmitter means which detects the rotational speed condition of a corresponding transmission member of the change-speed transmission.

2. A control installation according to claim 1, characterized in that the change-speed transmission is a planetary gear change-speed transmission.

3. A control installation according to claim 1, with a brake drum and a brake band operable to engage the brake drum, characterized in that for the engagement of the band brake, a toothed means is arranged at a part rotating with the brake drum, an inductive rotational speed transmitter means is coordinated to said toothed means, and a pulse is operable to be triggered by the rotational speed transmitter means during standstill or reversal of the direction of rotation.

4. A control installation according to claim 3, characterized in that the toothed means are arranged at the brake drum itself.

5. A control installation according to claim 3, characterized in that two inductive rotational speed transmitter means are arranged at the brake drum which are displaced in the circumferential direction with respect to each other by half a pulse.

6. A control installation for shifting-back an automatically shifted change-speed transmission in which are various speeds are adapted to be shifted be servo-means actuated by a pressure medium, and in which the servo-means of the speed to be engaged is brought into operational readiness and is fully shifted by a feeler means only after the determination of the correct shifting point by said feeler means, characterized in that the servo-means of the speed to be engaged includes an actuating member operatively connected with a pressure line, a solenoid valve means being coordinated to the pressure line leading to the actuating member of the servo-means of the speed to be engaged, said solenoid valve means being operable to be shifted by a shifting pulse into a position releasing the pressure on the actuatinng member of the servo-means of the speed to be engaged, and means for producing the shifting pulse by at least one rotational speed transmitter means which detects the rotational speed condition of a corresponding transmission member, and further characterized in that one toothed means each and one inductive frequency transmitter each are arranged at the input member and output member of the transmission, means including a frequency voltage converter means for forming a voltage proportional to the input rotational speed and the output rotational speed, means for forming the ratio of the two proportional voltages and for triggering a pulse in a comparator means when said ratio is equal to or larger than a voltage value corresponding to the transmission ratio of the respectively engaged speed.

7. A control installation according to claim 6, characterized in that the comparator means forms part of an electronic unit.

8. A control installation according to claim 6, characterized in that the solenoid valve means is operatively connected with the output of a NOR element, one of the two parts consisting of pulse transmitter and comparator means being operatively connected to the first input of the NOR element, and a means for a forced shifting-back operation being operatively connected to the second input of the NOR element.

9. A control installation according to claim 8, characterized in that the means for a forced shifting-back operation includes two shifting devices, of which each is adapted to be closed during the actuation of the selector lever into a respective lower range, each shifting device being operatively connected with the input of an OR element.

10. A control installation according to claim 9, characterized in that the shifting device is arranged at a control member of the driving engine which in the position "idling" closes and which is operatively connected with the first input of an AND element, the second input of the AND element being operatively connected with the output of the OR element, and the output of the AND element being operatively connected with the input of the NOR element.

11. A control installation for shifting-back an automatically shifted change-speed transission in which the various speeds are adapted to be shifted by servo-means actuated by a pressure medium, and in which the servo-means of the speed to be engaged is brought into operational readiness and is fully shifted by a feeler means only after the determination of the correct shifting point by said feeler means, characterized in that the servo-means of the speed to be engaged includes an actuating member operatively connected with a pressure line, a solenoid valve means being coordinated to the pressure line leading to the actuating member of the servo-means of the speed to be engaged, said solenoid valve means being operable to be shifted by a shifting pulse into a position releasing the pressure on the actuating member of the servo-means of the speed to be engaged, and means for producing the shifting pulse by at least one rotational speed transmitter means which detects the rotational speed condition of a corresponding transmission member, and further characterized in that the solenoid valve means is operatively connected with the output of a NOR element, the pulse transmitter being operatively connected to the first input of the NOR element, and a means for a forced shifting-back operation being operatively connected to the second input of the NOR element.

12. A control installation according to claim 11, characterized in that the means for a forced shifting-back operation includes two shifting device, of which each is adapted to be closed during the actuation of the selector lever into a respective lower range, each shifting device being operatively connected with the input of an OR element.

13. A control installation according to claim 12, characterized in that the shifting device is arranged at a control member of the driving engine which in the position "idling" closes and which is operatively connected with the first input of an AND element, the second input of the AND element being operatively connected with the output of the OR element, and the output of the AND element being operatively connected with the input of the NOR element.

14. A control installation according to claim 13, characterized in that the change-speed transmission is a planetary gear change-speed transmission.

15. A control installation for shifting-back an automatically shifted change-speed transmission in which the various speeds are adapted to be shifted by servo-means actuated by a pressure medium, and in which the servo-means of the speed to be engaged is brought into operational readiness and is fully shifted by a feeler means only after the determination of the correct shifting point by said feeler means, characterized in that the servo-means of the speed to be engaged includes an actuating member operatively connected with a pressure line, a solenoid valve means being coordinated to the pressure line leading to the actuating member of the servo-means of the speed to be engaged, said solenoid valve means being operable to be shifted by a shifting pulse into a position releasing the pressure on the actuating member of the servo-means of the speed to be engaged, and means for producing the shifting pulse by at least one rotational speed transmitter means which detects the rotational speed condition of a corresponding transmission member, said rotational speed transmitter means triggering said shifting pulse means upon detection of the standstill or reversal of the direction of rotation of the detected transmission member.

16. A control installation according to claim 15, with a brake drum and a brake band operable to engage the brake drum, characterized in that for the engagement of the band brake, a toothed means is arranged at a part rotating with the brake drum, and said rotational speed transmitter means includes an inductive rotational speed transmitter means coordinated to said toothed means.

* * * * *